US008656698B1

(12) United States Patent
Jansen et al.

(10) Patent No.: US 8,656,698 B1
(45) Date of Patent: Feb. 25, 2014

(54) FLOW CONTROLLER AND MONITORING SYSTEM

(75) Inventors: Harvey B. Jansen, Mesa, AZ (US); Schuyler V. McElrath, Easley, SC (US)

(73) Assignee: Jansen's Aircraft System Controls, Inc., Tempe, AZ (US)

( * ) Notice: Subject to any disclaimer, the term of this patent is extended or adjusted under 35 U.S.C. 154(b) by 1230 days.

(21) Appl. No.: 12/473,938

(22) Filed: May 28, 2009

Related U.S. Application Data

(60) Provisional application No. 61/056,578, filed on May 28, 2008.

(51) Int. Cl.
*F02C 1/00* (2006.01)

(52) U.S. Cl.
USPC .......................................... 60/39.281; 60/734

(58) Field of Classification Search
USPC ............. 60/39.281, 734, 776; 137/487.5, 563
See application file for complete search history.

(56) References Cited

U.S. PATENT DOCUMENTS

| 698,474 | A | | 3/1902 | Ebbs |
| 956,538 | A | | 5/1910 | Mitchell |
| 1,013,867 | A | | 1/1912 | Denker |
| 2,505,613 | A | | 4/1950 | Farris |
| 3,584,194 | A | | 6/1971 | Kautz |
| 3,901,269 | A | | 8/1975 | Henderson |
| 4,027,474 | A | | 6/1977 | Demase |
| 4,210,125 | A | * | 7/1980 | Fender ......................... 126/587 |
| 4,583,570 | A | | 4/1986 | Rabe |
| 4,633,939 | A | | 1/1987 | Granetzke |
| 4,656,827 | A | * | 4/1987 | Puillet ........................ 60/39.281 |
| 5,014,738 | A | | 5/1991 | Jones |
| 5,062,445 | A | | 11/1991 | Junier |
| 5,103,777 | A | | 4/1992 | Daikoku |
| 5,762,099 | A | | 6/1998 | Croucamp et al. |
| 6,050,081 | A | | 4/2000 | Jansen et al. |
| 6,182,685 | B1 | | 2/2001 | Goff et al. |
| 6,250,063 | B1 | | 6/2001 | Davis, Jr. et al. |
| 6,253,573 | B1 | | 7/2001 | Schwitters et al. |
| 6,427,717 | B1 | | 8/2002 | Kimura |
| 6,438,963 | B1 | | 8/2002 | Traver et al. |
| 6,609,380 | B2 | | 8/2003 | Mick et al. |

(Continued)

OTHER PUBLICATIONS

Jansen's Aircraft Systems Control Website. Archived on Wayback machine, Jul. 11, 2003. http://web.archive.org/web/20030711235731/jasc-controls.com/products.htm.

*Primary Examiner* — Ehud Gartenberg
*Assistant Examiner* — Vikansha Dwivedi
(74) *Attorney, Agent, or Firm* — Quarles & Brady LLP (57) ABSTRACT

A device and system for monitoring and controlling the flow media through a flow circuit, for example, the flow of coolant through a coolant circuit of a turbine engine fuel system, measures flow rates at the supply and return sides of the circuit and compares the measured flow rates against a threshold flow rate difference to detect the presence of a flow leak condition. Upon detecting a leak condition, the controller automatically operates a flow control valve to shut off flow to the flow circuit for repair of the leak or other low flow condition. The controller can also include components for measuring the temperate of the flow media at one or both of the supply and return sides of the circuit. The measured temperature signals can be processed to detect a high or low temperature condition. Upon detecting a low temperature condition, the controller automatically reduces the flow rate of the flow media until the condition has been corrected.

15 Claims, 5 Drawing Sheets

(56) References Cited

U.S. PATENT DOCUMENTS

| | | |
|---|---|---|
| 6,675,583 B2 | 1/2004 | Willis et al. |
| 6,729,135 B1 | 5/2004 | Norris et al. |
| 6,918,255 B2 | 7/2005 | Kaplan et al. |
| 7,044,155 B2 | 5/2006 | Zanolin et al. |
| 7,117,675 B2 | 10/2006 | Kaplan et al. |
| 7,527,068 B2 | 5/2009 | Jansen |
| 2002/0084065 A1 | 7/2002 | Isaac, Jr. |

* cited by examiner

FLOW CONTROLLER AND MONITORING SYSTEM

CROSS-REFERENCE TO RELATED APPLICATION

This application claims benefit to U.S. provisional application Ser. No. 61/056,578, filed May 28, 2008.

STATEMENT OF FEDERALLY SPONSORED RESEARCH OR DEVELOPMENT

Not applicable.

BACKGROUND OF THE INVENTION

1. Technical Field

The present invention relates to the monitoring and control of systems for delivering gaseous and liquid media, and in one particular application the monitoring and control of coolant in a fuel control system for gas turbine engines.

2. Description of the Related Art

There are numerous applications in which gaseous or liquid media is circulated or otherwise delivered through lines. For example, the coolant flow media could be circulated through a closed system of lines or other conduit to carry away heat from system components that generate heat or are required to operate in a high temperature environment. One such application is the fuel system of a gas turbine engine, such as the large, multi-stage turbines used in the power generation industry.

Gas turbine engines of this sort have a set of rotating turbine blades that compress air leading to a combustion chamber into which fuel is injected and ignited. Fuel is delivered through metering orifices to burners in the combustion chamber under pressure through a fuel line. Combustion of the fuel turns a downstream set of blades from which energy is extracted and which can also be used to drive the compressor blades. An array of combustion cans are arranged in the turbine, each with several burner nozzles that ignite the fuel at light-off and sustain combustion during operation. The combustion cans of the turbine are high pressure and temperature environments. It is typical for the environment surrounding the combustion cans to reach temperatures of 400° F., and for the combustion chamber temperature to near 2,000° F. The liquid fuel is consumed at a rate of about 20 gallons per minute at a high fuel pressure of about 1200 psig. This extreme environment is very hard on the fuel control components of the turbine fuel system, particularly for dual fuel turbines in which the during sustained gaseous burn, the liquid fuel system remains inoperable for long periods of time.

A principal concern is the formation of the coke, or the tarry deposits left after the distillate or volatile components of the fuel are driven off by heat, on the metering orifices and other working surfaces of the liquid fuel control components. Coke deposits arise primarily from the presence of residual fuel left in the fuel atomizer, burner nozzles, control valves, fuel manifolds, and other components subjected to the high heat of combustion. Residual liquid fuel left in the liquid fuel control components during gaseous operation will begin to coke at temperatures of about 250-280° F. in the presence of oxygen, which are well under the combustion temperature.

To reduce the effects of coking liquid fuel can be circulated through a heat exchanger to cool the temperature of the liquid fuel distillate to below the coking threshold temperature during operation of the turbine in gaseous fuel mode, see U.S. Pat. No. 6,729,135. However, this system requires a heat exchanger and either a separate fuel recirculation pump or increased duty on the main fuel pump. Moreover, because the recirculation lines carry liquid fuel, these lines, along with any recirculation control components, present yet another location for coking to occur when the recirculation system is not operating. To avoid this, during liquid fuel operation some of the liquid fuel must be made to bypass the combustor to flow through the recirculation system.

Dedicated cooling circuits can be used that avoid the aforementioned problems with using fuel as the coolant. However, this too can be problematic if not properly monitored and controlled. For one thing, if the coolant runs too hot, then adequate cooling may not be achieved such that components may undergo the coking problem discussed above. Also, if the coolant were to leak, otherwise flow at an insufficient rate, not only could coking occur, but in the event of a leak in which coolant is sprayed onto the turbine, "turbine rub" could result, a condition in which housing components of the turbine shrink or contract from cooling caused by the leak and interfere with the turbine blades. If left unchecked, turbine rub can cause significant damage to the large, rotating turbine blades and render the turbine inoperable. Further, if the coolant were to run too cold, for example if at an excessive flow rate or supply conditions were at an insufficient temperature, then the coolant could actually reduce the fuel temperature sufficiently to case "waxing", a condition in which the fuel media, such as diesel fuel, begins to turn into a paraffin material. This condition disrupts the fuel delivery system and can similarly render the turbine inoperable. In addition to the waxing problem, excessively cold coolant can interfere with the proper operation of other components or sub-systems, for example, fogging of the optical pyrometer.

SUMMARY OF THE INVENTION

The present invention generally provides a watch-dog device and system for monitoring and controlling the flow media through a flow circuit. While the device and system of the present invention can be applied to numerous liquid and gaseous media flow systems, it is particularly suited for use with the coolant circuit used to cool components of the fuel system for a turbine engine.

Generally, the invention provides a device and system for measuring the flow rates at the supply and return sides of the flow circuit and comparing the measured flow rates against a threshold flow rate difference to detect the presence of a flow shut off condition. Upon detecting a flow shut off condition, the controller automatically operates a flow control valve to shut off flow to the flow circuit for repair of the leak or other low flow condition. The controller can also include components for measuring the temperate of the flow media at one or both of the supply and return sides of the circuit. The measured temperature signals can be processed to detect a high or low temperature condition. Upon detecting a low temperature condition, the controller automatically reduces the flow rate of the flow media until the condition has been corrected.

Specifically, in one aspect the invention provides a flow controller for a flow circuit having a supply line and a return line. The flow controller has an enclosure, a supply side flow measurement device contained within the enclosure coupled to the supply line, a return side flow measurement device contained within the enclosure coupled to the return line, and control electronics contained within the enclosure operatively coupled to the return side and supply side flow measurement devices. The control electronics control flow through the flow circuit based on the relative values of inputs from the supply side and return side flow measurement devices.

In another aspect the invention can be incorporated in a fuel system for a turbine engine having a fuel circuit operable to deliver fuel from a fuel supply to the turbine engine, a coolant circuit operable to flow coolant from a supply line to a return line, and a valve coupled to the fuel circuit for controlling fuel flow and being cooled by the coolant in the coolant circuit. The coolant flow controller has an enclosure, a supply side flow measurement device contained within the enclosure coupled to the supply line, a return side flow measurement device contained within the enclosure coupled to the return line, a shut-off valve contained within the enclosure coupled to the supply line, and control electronics contained within the enclosure operatively coupled to the return side and supply side flow measurement devices. The control electronics control flow through the coolant circuit based on the relative values of inputs from the supply side and return side flow measurement devices corresponding to flow rates through the respective supply and return lines. The control electronics compare the supply line and return line flow rates and operates the shut-off valve to close off the supply line when a threshold flow rate difference is achieved.

In another aspect the invention provides a method of controlling flow through a flow circuit by passing a supply flow into a flow controller, passing a return flow into the flow controller, measuring the supply flow, measuring the return flow, processing a measured supply flow signal and a measured return flow signal to determine a flow shut-off condition, and operating a flow valve to shut off the supply flow.

These and still other advantages of the invention will be apparent from the detailed description and drawings. What follows are preferred embodiments of the present invention. To assess the full scope of the invention the claims should be looked to as the preferred embodiments are not intended as the only embodiments within the scope of the invention.

DETAILED DESCRIPTION OF THE PREFERRED EMBODIMENTS

The present invention provides a watch-dog monitoring and control system and device for gaseous and/or liquid flow systems. The device and system of the present invention is application for use with any closed system of circulating flow media, for example the chemical processing, crude processing, cooling of turbine engine flame detection devices, and other industries. Another application for which the present invention may be used advantageously is for the monitoring and control of coolant circuits, such as a coolant circuit for a turbine engine fuel system. A detailed explanation of the device and system of the present invention as used with the coolant circuit of a turbine engine will now be described.

Figure 1:
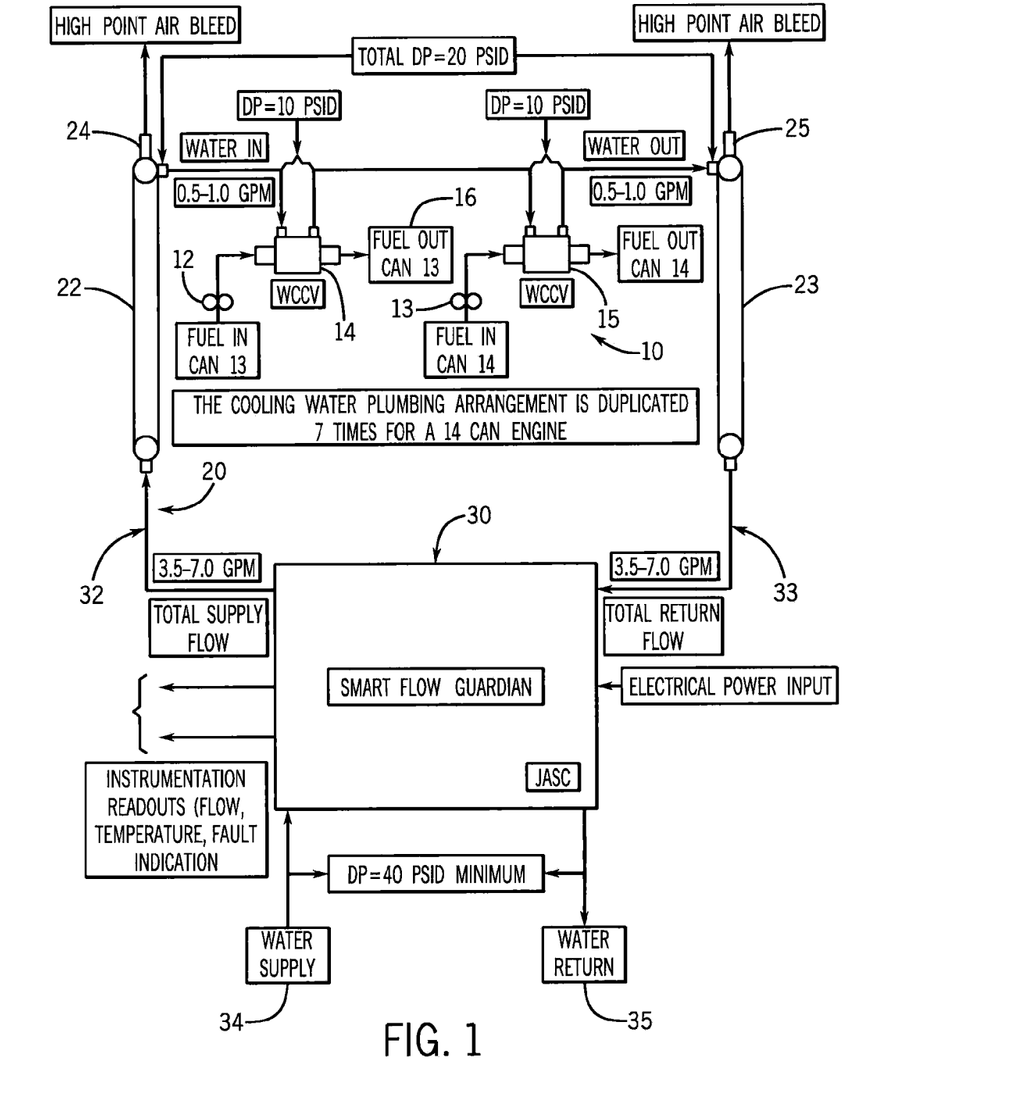
FIGS. 1 and 5 are block diagrams of a fuel system for a turbine engine having a cooling circuit and a coolant flow controller according to the present invention.
Figure 5:
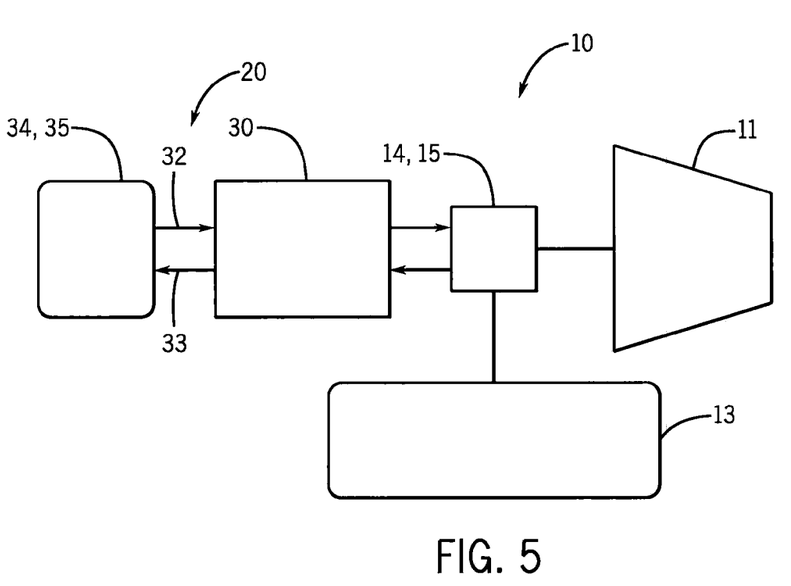

FIGS. 1 and 5 of the drawings shows a simplified schematic for a portion of an exemplary fuel system 10 for a gas turbine engine 11 of the type used in the power generation industry. This figure shows flow dividers 12 and 13 and check valves 14 and 15 of the fuel system 10 upstream from two combustion cans 16 and 17 of a multi-can turbine engine 11, which receives fuel from a fuel tank 13. The check valves 14 and 15 are located near the combustion cans 16 and 17, and thus in the associated high temperature environment. To reduce or prevent coking, the check valves 14 and 15 can be actively cooled. A suitable liquid cooled check valve is commercially available from Jansen's Aircraft Systems Controls, Inc. of Tempe, Ariz., as disclosed in U.S. Pat. No. 7,527,068, the disclosure of which is hereby incorporated into the present application as though fully set forth herein.

The check valves 14 and 15 are cooled by coolant flowing through an isolated coolant circuit 20 defined by suitable lines or conduit, which deliver and carry away the coolant from the check valves 14 and 15 and other components of the fuel system 10. The coolant can be any suitable media, such as non-fuel liquid fluid, preferably water of a lower temperature than the liquid fuel in the fuel system 10. The coolant lines connect to the check valves 14 and 15 for combustion cans 16 and 17 as well as the check valves (not shown) for the other combustion cans (not shown) of the turbine engine 11, such as the additional twelve combustion cans of a fourteen can engine, as is conventional, via inlet 22 and outlet 23 manifolds. The manifolds 22 and 23 can have a toroidal configuration aligning with the circular array of combustion cans in conventional turbine engines. Each manifold 22 and 23 can be vented to bleed air in the coolant circuit via an associated valve 24 and 25 at the vertical high point of each manifold.

A flow controller 30 is coupled to the coolant circuit 20 via supply 32 and return 33 lines or conduit, which are coupled to the inlet 22 and outlet 23 manifolds, respectively. Additional lines or conduit couple the flow controller 30 to a coolant supply 34 and coolant return 35, which can be continuous flowing water supply, such as a building water supply and drain, or a recirculated supply tank with or without external cooling having a low pressure pump (not shown) in line with the conduit that circulates the coolant through the circuit at a suitable rate to effect sufficient heat transfer to maintain residual fuel in the check valves below the coking threshold temperature, which is approximately 250-280° F.

Figure 2:
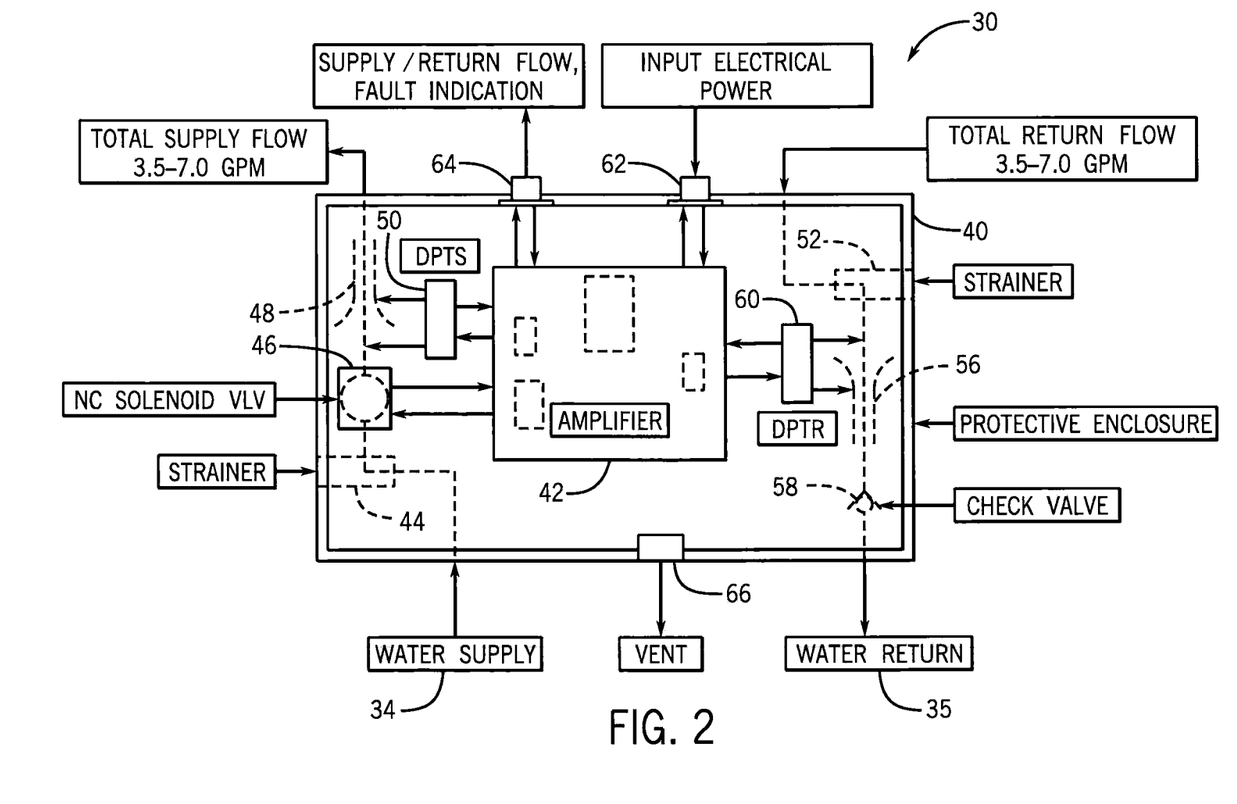
FIG. 2 is a block diagram of a first embodiment of the coolant flow controller thereof.

FIG. 2 shows a schematic view of a first embodiment of the flow controller 30. In particular, the flow controller 30 has a protective enclosure 40 that contains control electronics 42, including a microprocessor, memory, and other conventional electrical components creating an amplifier circuit of the type known in the art. The control electronics 42 are isolated, by a sealed internal housing (not shown), from the supply and return flow streams. At the supply side, the coolant supply line couples via an inlet fitting (not shown) to a strainer 44, made of suitable screen or mesh material, for filtering particles, contaminants, and the like from the supply flow stream. A shut-off valve 46, such as a normally closed solenoid valve, is located in-line downstream from the strainer 44. The shut-off valve 46 is electrically connected to the control electronics 42 for electronic actuation of the valve 46. Downstream from the shut-off valve 46 is a supply flow measurement device 48, the outlet of which couples via an outlet fitting (not shown) to the coolant supply line 32. The supply flow measurement device 48 can be any suitable flow meter, such as a turbine flow meter or a coriolous effect flow meter. In the example embodiment shown in FIG. 2, the flow meter has a venturi passageway which enhances the measureability of the flow by effecting a large pressure drop from the inlet to the neck of the venturi, but then recovering the pressure between the neck and the outlet. A supply pressure transducer 50 is coupled between the inlet and neck of the venturi and also electrically coupled to the control electronics 42. The transducer 50 provides input signals to the control electronics 42, which are processed by the processor to calculate a supply flow rate. At the return side, the coolant return line 33 couples via an inlet fitting (not shown) to a strainer 52, made of suitable screen or mesh material, for filtering particles, contaminants, and the like from the return flow stream. Downstream from the strainer 52 is a return flow measurement device 56, the outlet of which couples, after a back flow check valve 58, to the coolant return line via an outlet fitting (not shown). The return flow measurement device 56 can be the same as the supply flow measurement device 48, again having a venturi passageway, which effects a large pressure drop from the inlet to the neck of the venturi, which is recovered between the neck and the outlet. A return pressure transducer 60 is coupled between the inlet and neck of the venturi and also electrically coupled to the control electronics 42. The transducer 60 provides input signals to the control electronics 42, which are processed by the processor to calculate a return flow rate. The flow controller 30 also has a power input 62 and input/output interface 64 for instrumentation readouts, for example, including flow rate and fault condition indication. Additionally, the enclosure 40 is vented via vent 66 to prevent any minor plumbing leaks from building up fluid within the enclosure 40.

In operation, the coolant flows from the coolant supply 34 through supply side of the flow controller 30 and then onto the remainder of the coolant circuit 20 to bring relatively lower temperature coolant to the check valves 14 and 15. Heat from the check valves 14 and 15 is carried away through the return side of the coolant circuit 20 and into and through the return side of the flow controller 30 to the coolant return 35. As the coolant flows through the flow controller 30, the supply side 48 and return side 56 flow measurement devices detect a pressure drop and transmit input signals to the control electronics 42, which calculates supply and return flow rate values. The control electronics 42 compares, continuously or at prescribed intervals, the supply side and return side flow rates at the same point in time. The flow rates can be output via the input/output interface 64 to a display or other digital or analog interface. Differences between the supply side and return side flow rates detected by the control electronics 42 are evaluated against a threshold flow rate difference stored in memory. When the threshold is reached, the control electronics 42 signals the normally closed shut-off valve 46 (which was initially opened by the control electronics 42 when the coolant circuit began flowing) to close, and thereby shut off flow of the coolant. Reaching the threshold difference corresponds to a fault or flow shut-off condition, such as a leak or blockage in the coolant circuit, which needs to be corrected in order to prevent coking, turbine rub or other problems that could interfere with proper operation of the fuel system and/or the turbine engine generally.

In the exemplary system shown in FIG. 1, the coolant flows into the inlet manifold 22 at an approximate flow rate of 3.5 to 7.0 GPM. After passing through the inlet manifold 22, the coolant flows into and through the check valves 14 and 15 at a flow rate of approximately 0.5 to 1.0 GPM. A pressure drop of approximately 10 psid is realized across each check valve 14 and 15 for a total pressure drop of 20 psid across the pair of check valves 14 and 15. The flow controller 30 realizes a pressure drop of approximately 40 psid between the supply and return sides.

Figure 3:
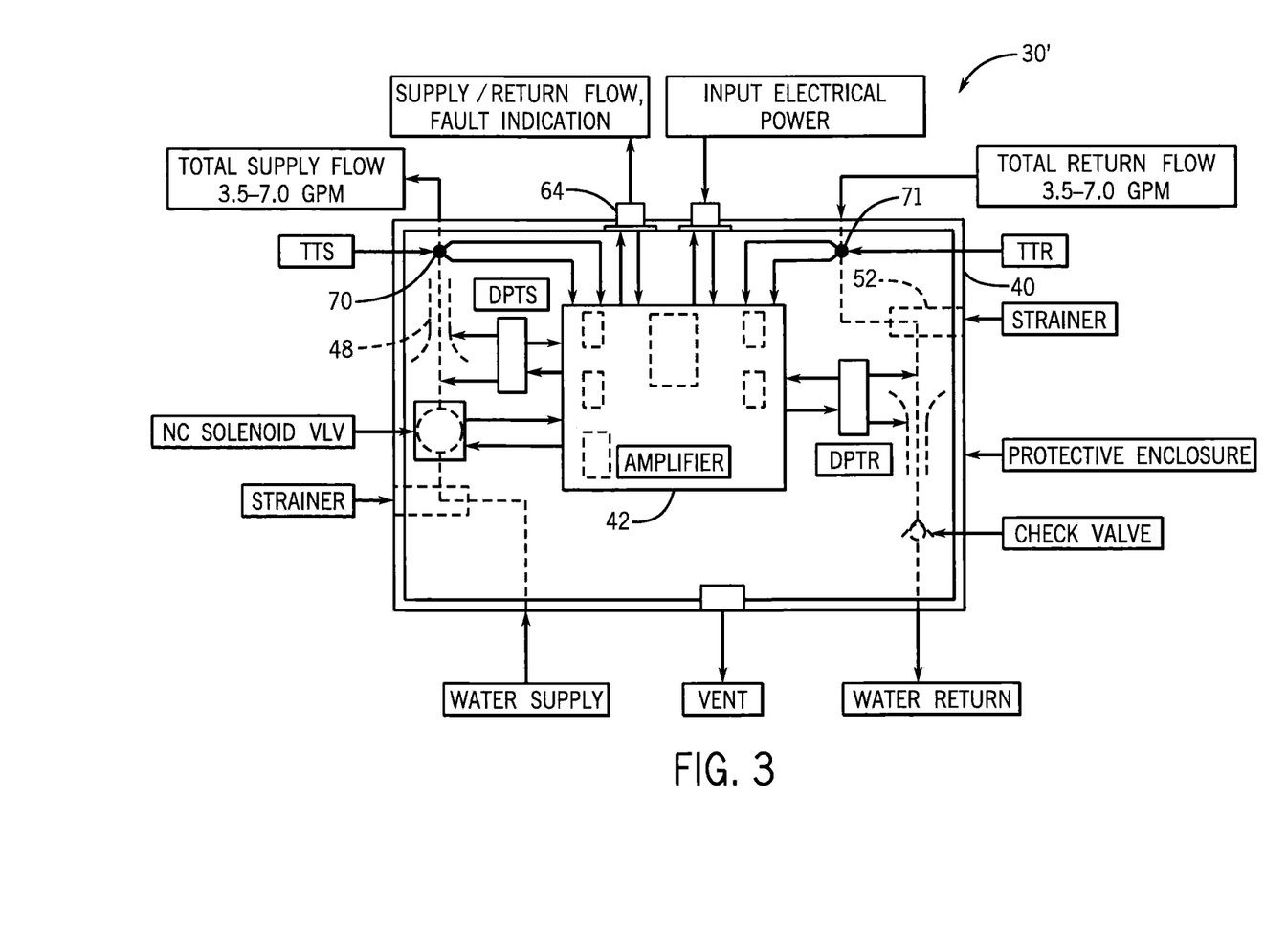
FIG. 3 is a block diagram of a second embodiment of the coolant flow controller thereof.

FIG. 3 shows another embodiment of the flow controller designated by reference number 30'. The flow controller 30' is the same as the previously described embodiment with the addition of supply side 70 and return side 71 temperature transducers contained in the enclosure 40. The supply side temperature transducer 70 is coupled to the supply side of the coolant circuit downstream from the supply side flow measurement device 48, and the return side temperature transducer 71 is coupled to the return side of the coolant circuit upstream from the strainer 52. The transducers 70 and 71 can be conventional thermocouples or resistive temperature devices, or the like, that are electrically coupled to the control electronics 42. The respective temperatures of the supply side and return side coolant can be output to a display or other interface via the input/output interface 64 for visual inspection. Thus, in addition to flow rate monitoring, fault detection and coolant shut-off, this version of the flow controller 30' thus provides thermostatic monitoring of the coolant circuit. Excessive temperatures of the coolant, approximately 150° F. or more, can be identified and corrected before coking of the fuel components occurred. Also, insufficient temperatures of the coolant, approximately 50° F. or less, can be identified and corrected before waxing of the fuel occurred.

Figure 4:
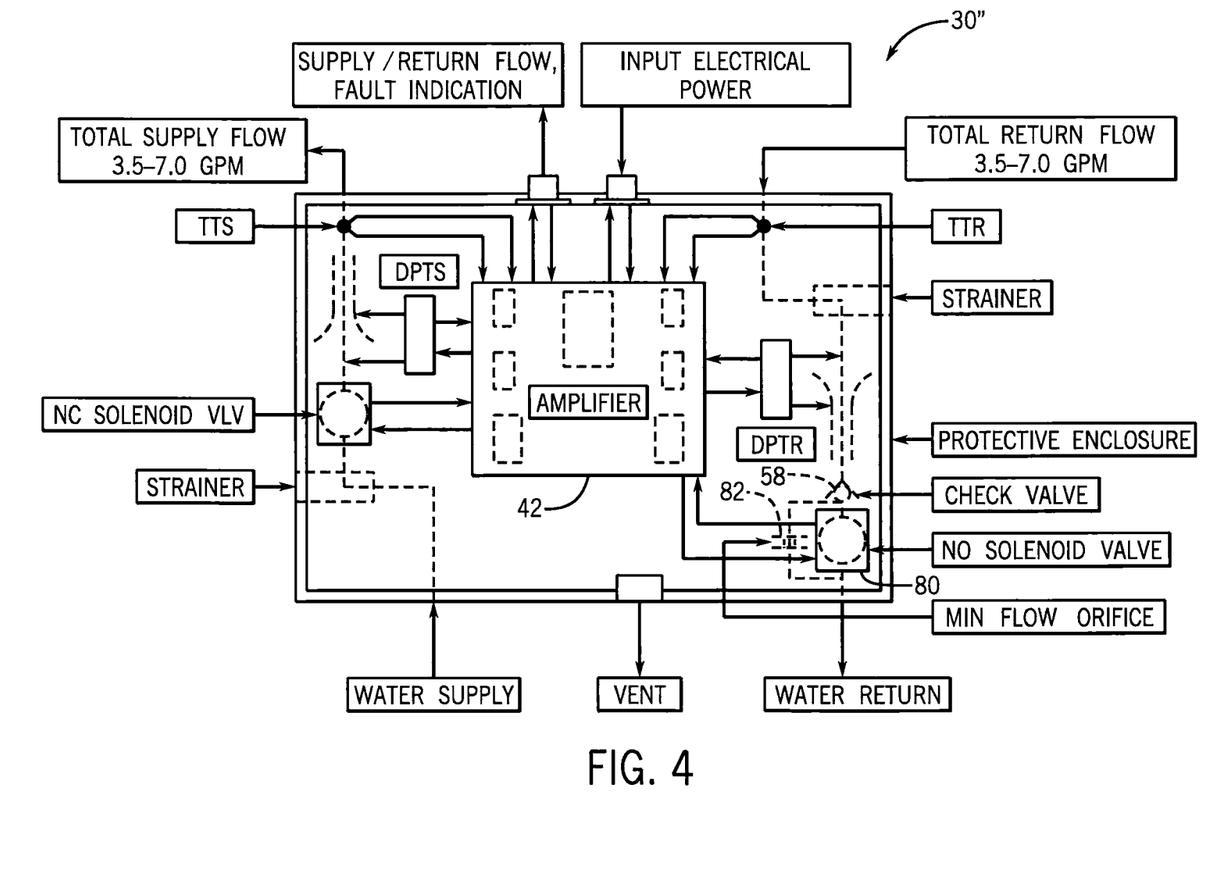
FIG. 4 is a block diagram of a third embodiment of the coolant flow controller thereof.

FIG. 4 shows another embodiment of the flow controller designated by reference number 30". The flow controller 30" is the same as the second described embodiment with the addition of second shut-off valve 80, which is located on the return side of the flow controller downstream from the back flow check valve 58. The return side shut-off valve 80 can be a normally open solenoid valve that is electronically coupled to the control electronics 42. Also, a narrow, always open flow orifice 82 is disposed in parallel with the return side shut-off valve 80. Thus, in addition to flow rate monitoring, fault detection and coolant shut-off, this version of the flow controller 30" provides for automatic thermostatic monitoring and flow rate control of the coolant, by operating the return side shut-off valve 80 in the event of an out of range temperature condition being detected by the control electronics 42. By closing the shut-off valve 80 return flow passes only through the open flow orifice 82 to establish a minimum flow of coolant necessary to maintain sufficient cooling of the fuel components to prevent coking, but which will slow the flow rate of coolant through the entire coolant circuit to sufficiently to prevent over cooling of the fuel components that could lead to fuel waxing or other over cooling problems.

The present invention thus provides a device and system for monitoring and controlling the flow media through a flow circuit, for example, the flow of coolant through a coolant circuit of a turbine engine fuel system. The device and system measures flow rates at the supply and return sides of the flow circuit and compares the measured flow rates against a threshold flow rate difference to detect the presence of a flow shut off condition. Upon detecting a flow shut off condition, the controller automatically operates a flow control valve to shut off flow to the flow circuit for repair of the leak or other low flow condition. The controller can also include components for measuring the temperate of the flow media at one or both of the supply and return sides of the circuit. The measured temperature signals can be processed to detect a high or low temperature condition. Upon detecting a low temperature condition, the controller automatically reduces the flow rate of the flow media until the condition has been corrected.

It should be appreciated that merely preferred embodiments of the invention have been described above. However, many modifications and variations to the preferred embodiments will be apparent to those skilled in the art, which will be within the spirit and scope of the invention. For example, gauges and other visual interfaces can be mounted on-board the enclosure, rather than being output to a remote display or interface. Also, manual operation of the flow shut-off valve(s) could be provided using suitable inputs and interfaces via the input/output interface 64. And, automatic thermostatic flow control can be achieved by using a throttling or other variable control valve at the supply side, rather than the solenoid valves at both the supply and return sides of the flow controller.

Therefore, the invention should not be limited to the described embodiments. To ascertain the full scope of the invention, the following claims should be referenced.

What is claimed is:

1. A flow controller for a flow circuit having a supply line and a return line in which the supply line is fluidly coupled to an inlet side of a flow control component and the return line is fluidly coupled to an outlet side of the flow control component, the flow controller comprising:
   an enclosure;
   a supply side flow measurement device contained within the enclosure coupled to the supply line at the inlet side of the flow control component;
   a return side flow measurement device contained within the enclosure coupled to the return line at the outlet side of the flow control component; and
   control electronics contained within the enclosure operatively coupled to the return side and supply side flow measurement devices, the control electronics controlling flow through the flow circuit based on the relative values of inputs from the supply side and return side flow measurement devices.

2. The flow controller of claim 1, wherein the inputs from the supply side and return side flow measurement devices correspond to flow rates through the respective supply and return lines, and wherein the control electronics compares the supply line and return line flow rates to determine whether a threshold flow rate difference has been achieved.

3. The flow controller of claim 2, further including a shut-off valve contained within the enclosure operable by the control electronics to close off the supply line when the threshold flow rate difference is achieved.

4. The flow controller of claim 1, further including a supply temperature transducer contained within the enclosure coupled to the supply line and a return temperature transducer contained with the enclosure coupled to the return line, wherein the control electronics receive temperature inputs from the supply and return temperature transducers.

5. The flow controller of claim 4, wherein the control electronics process the temperature inputs and controls the flow rate through the flow circuit based on the temperature inputs relative to at least one threshold temperature value.

6. The flow controller of claim 5, further including a flow control valve contained within the enclosure coupled to at least one of the supply and return lines, and wherein the control electronics operate the flow control valve to reduce the flow rate of the flow circuit when one of the temperature inputs reaches a threshold low temperature value.

7. The flow controller of claim 6, wherein the flow control valve is an electronically controlled shut-off valve coupled to the return line.

8. The flow controller of claim 7, further including an always open flow orifice coupled to the return line in parallel with the shut-off valve.

9. The flow controller of claim 7, further including an electronically controlled shut-off valve coupled to the supply line.

10. The flow controller of claim 1, wherein the supply side and return side flow measurement devices each include a venturi flow meter and a pressure transducer sensing a pressure drop through the flow meter.

11. In a fuel system for a turbine engine having a fuel circuit operable to deliver fuel from a fuel supply to the turbine engine, a coolant circuit operable to flow coolant from a supply line to a return line, and a fuel valve coupled to the fuel circuit for controlling fuel flow and being cooled by the coolant in the coolant circuit, in which the supply line is fluidly coupled to an inlet side of the fuel valve and the return line is fluidly coupled to an outlet side of the fuel valve, a coolant flow controller, comprising:
   an enclosure;
   a supply side flow measurement device contained within the enclosure coupled to the supply line at the inlet side of the fuel valve;
   a return side flow measurement device contained within the enclosure coupled to the return line at the outlet side of the fuel valve;
   a shut-off valve contained within the enclosure coupled to the supply line; and
   control electronics contained within the enclosure operatively coupled to the return side and supply side flow measurement devices, the control electronics controlling flow through the coolant circuit based on the relative values of inputs from the supply side and return side flow measurement devices corresponding to flow rates through the respective supply and return lines, and wherein the control electronics compare the supply line and return line flow rates and operates the shut-off valve to close off the supply line when a threshold flow rate difference is achieved.

12. The coolant flow controller of claim 11, further including a supply temperature transducer contained within the enclosure coupled to the supply line and a return temperature transducer contained with the enclosure coupled to the return line, wherein the control electronics receive temperature inputs from the supply and return temperature transducers.

13. The coolant flow controller of claim 12, wherein the control electronics processes the temperature inputs and controls the flow rate through the coolant circuit based on the temperature inputs relative to at least one threshold temperature value.

14. The coolant flow controller of claim 13, further including a shut-off valve contained within the enclosure coupled to the return line, and wherein the control electronics operate the return line shut-off valve to reduce the flow rate of the coolant circuit when one of the temperature inputs reaches a threshold low temperature value.

15. The coolant flow controller of claim 14, further including an always open flow orifice coupled to the return line in parallel with the shut-off valve.

\* \* \* \* \*